(12) United States Patent
Veit et al.

(10) Patent No.: US 9,291,215 B2
(45) Date of Patent: Mar. 22, 2016

(54) PISTON-CYLINDER ARRANGEMENT AND OPERATING DEVICE HAVING A PISTON-CYLINDER ARRANGEMENT

(71) Applicant: BorgWarner Inc., Auburn Hills, MI (US)

(72) Inventors: Matthias Gerhard Veit, Oftersheim (DE); Alexander Moser, Ketsch (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/315,628

(22) Filed: Jun. 26, 2014

(65) Prior Publication Data

US 2015/0001032 A1    Jan. 1, 2015

(30) Foreign Application Priority Data

Jul. 1, 2013    (DE) .......................... 10 2013 010 960

(51) Int. Cl.
*F16D 48/02*    (2006.01)
*F16D 25/08*    (2006.01)
*F16D 125/06*   (2012.01)

(52) U.S. Cl.
CPC .......... *F16D 25/08* (2013.01); *F16D 2025/081* (2013.01); *F16D 2048/0212* (2013.01); *F16D 2125/06* (2013.01)

(58) Field of Classification Search
CPC .................. F16D 2025/081; F16D 2048/0212
See application file for complete search history.

(56) References Cited

U.S. PATENT DOCUMENTS

| | | | | |
|---|---|---|---|---|
| 6,234,290 B1 * | 5/2001 | Drexl | ...................... | B60K 23/02 192/85.51 |
| 2007/0068749 A1 * | 3/2007 | Ullmann | .................. | B60T 13/02 188/156 |
| 2012/0247913 A1 * | 10/2012 | Nakano | ................... | F16D 23/06 192/18 A |

FOREIGN PATENT DOCUMENTS

FR          3000773       * 11/2014

* cited by examiner

*Primary Examiner* — Ramya Burgess
*Assistant Examiner* — Mark Manley
(74) *Attorney, Agent, or Firm* — BrooksGroup (57) ABSTRACT

The present invention relates to a piston-cylinder arrangement (2) for the operating device of a clutch, having a cylinder (16), a piston (36) which is arranged in the cylinder (16) and can be displaced in the axial direction (4, 6), and at least one locking element (50) which is associated with the piston (36), wherein the piston (36) can be displaced from a first position into a second position in which the locking element (50) can be moved from a released position into a locked position in which the piston (36) is locked in the second position via the locking element (50) in a positively locking manner. According to the invention, the piston (36) can be displaced by means of a locking piston (52), which in the released position of the locking element (50) is connected via the locking element (50) to the piston (36) in a positively locking manner in the axial direction (4, 6) and in the second position of the piston (36), with displacement of the locking element (50) from the released position into the locked position relative to the piston (36), can be displaced in the axial direction (4) from an initial position into a locked position.

10 Claims, 11 Drawing Sheets

PISTON-CYLINDER ARRANGEMENT AND OPERATING DEVICE HAVING A PISTON-CYLINDER ARRANGEMENT

CROSS-REFERENCE TO RELATED APPLICATIONS

This application claims the benefit of German Patent Application No. 20 2013 010960.4 filed Jul. 1, 2013.

The present invention relates to a piston-cylinder arrangement for the operating device of a clutch, having a cylinder, a piston which is arranged in the cylinder and can be displaced in the axial direction, and at least one locking element which is associated with the piston, wherein the piston can be displaced from a first position into a second position in which the locking element can be moved from a released position into a locked position in which the piston is locked in the second position via the locking element in a positively locking manner. The present invention also relates to an operating device for operating a clutch having such a piston-cylinder arrangement.

Piston-cylinder arrangements for hydraulic operating devices are known from the prior art. These have a cylinder, a piston which is arranged in the cylinder and can be displaced in the axial direction, and at least one locking element which is associated with the piston. The piston can be displaced from a first position into a second position in which the locking element can be moved from a released position into a locked position in which the piston is locked in the second position via the locking element in a positively locking manner. Locking elements, which are movably arranged on the cylinder in order to move this via a drive from the released position into the locked position, and vice versa, are known from experience.

The known piston-cylinder arrangements have proved to be disadvantageous, however, insofar as the cost for the actuating and driving of the locking elements is increased.

It is therefore an object of the present invention to create a piston-cylinder arrangement for the operating device of a clutch which enables a simplified transfer of the locking element into the released or locked position. The present invention is also based on the object of creating an operating device for a clutch having such an advantageous piston-cylinder arrangement.

This object is achieved by the features which are disclosed in patent claims 1 and 11. Advantageous embodiments of the invention are the subject of the dependent claims.

The piston-cylinder arrangement according to the invention is designed for the operating device of a clutch, for example, preferably for the hydraulic operation of a clutch. Therefore, the piston-cylinder arrangement is preferably a hydraulic piston-cylinder arrangement. The piston-cylinder arrangement has a cylinder, a piston which is arranged in the cylinder and can be displaced in the axial direction, and at least one locking element which is associated with the piston. Although in this case one, or at least one, locking element is mostly referred to, provision is preferably made, nevertheless, for two, three or more locking elements in order to effect a reliable and uniform locking of the piston. The piston can be displaced from a first position into a second position inside the cylinder and therefore be displaced relative to the cylinder. The second position is preferably an end position of the piston in which the piston is supported, or can be supported, on the cylinder in one of the mutually opposite axial directions. In the second position of the piston, the locking element can be moved from a released position into a locked position, wherein the piston is locked in the second position via the locking element in a positively locking manner when the locking element is located in the locked position. Therefore, the piston is locked in the second position via the locking element in at least one of the mutually opposite axial directions, preferably in both axial directions, and therefore can no longer be displaced relative to the cylinder in this direction. In the piston-cylinder arrangement, the piston can be displaced by means of a locking piston, wherein for this purpose a drive or an operating element can be associated with the locking piston, via which the locking piston can be displaced in order to also displace the piston. In the released position of the locking element, the locking piston is connected to the piston via the locking element in a positively locking manner in the axial direction. Therefore, a displacement of the locking piston in at least one of the axial directions also effects a displacement of the piston in the said direction. If the piston reaches its second position, then the locking piston interacts with the locking element in such a way that the locking piston, with displacement of the locking element from the released position into the locked position, can be displaced relative to the piston in the axial direction from an initial position into a locked position. The displacement of the locking element is preferably carried out in this case outward in the radial direction.

The piston-cylinder arrangement according to the invention has the advantage that the locking element can be moved in a particularly simple manner from the released position into the locking position. Therefore, only a force in the axial direction has to be applied to the locking piston in order to displace the piston from the first position into the second position, wherein the locking piston, with this force being maintained, is automatically displaced from its initial position relative to the piston into its locked position when the piston has reached its second position. Therefore, transfer of the locking element from the released position into the locked position is carried out automatically as a result of the force which is applied to the locking piston for displacing the piston without the locking element having to be separately actuated or driven. This automatic feature simplifies both the construction and the operation of the piston-cylinder arrangement.

In order to ensure reliable locking of the piston in its second position, the locking element, in a preferred embodiment of the piston-cylinder arrangement according to the invention, with retention of the locking element in the locked position, can be supported, or is supported, on the locking piston in the locked position of said locking piston. In order to keep that force, which is required for retaining the locking piston in its locked position in this embodiment, particularly low, it is preferred if the locking element, in the locked position of the locking piston, with retention of the locking element in the locked position, can be supported, or is supported, on the locking piston perpendicularly to the axial direction or in the radial direction. In this case, it is also especially preferred if the supporting on the locking piston is carried out without creating a supporting force which acts upon the locking piston in the axial direction.

In order to effect the positively locking connection of the locking piston to the piston in the axial direction, in an advantageous embodiment of the piston-cylinder arrangement according to the invention provision is made in the outer side of the locking piston for a recess into which the locking element extends in the released position and out of which the locking element can be displaced by displacement of the locking piston from the initial position into the locked position. In the case of a plurality of locking elements, for example a recess can be provided in each case for each of the locking elements. In order to reduce the production cost, however, and to ensure increased functional reliability, it is preferred in the case of this embodiment if the recess is of a groove-like design and/or of an encompassing design in the circumferential direction. Regardless of the respective embodiment variant of the recess, it is also preferred in the case of this embodiment if the recess has a ramp-like cross section in order to enable a reliable and less effort-intensive displacement of the locking element by displacement of the locking piston from the initial position into the locked position. In this context, a circle segment-shaped cross section, trapezoidal cross section or triangular cross section of the recess has proved to be advantageous.

In a further advantageous embodiment of the piston-cylinder arrangement according to the invention, the locking element is connected to the piston with regard to the axial direction. Therefore, a displacement of the piston in the axial direction also always leads to a displacement of the locking element, or locking elements, in the axial direction.

In a further preferred embodiment of the piston-cylinder arrangement according to the invention, provision is made in the inner side of the cylinder for a recess into which the locking element can be displaced in the second position of the piston, achieving the locked position. In the case of the recess in the inner side of the cylinder, it is also preferably a groove-like recess and/or an encompassing recess in the circumferential direction in order to achieve the already previously indicated advantages of such a recess.

In order to achieve a lightweight and compact construction of the piston-cylinder arrangement, the piston, in an especially preferred embodiment of the piston-cylinder arrangement according to the invention, has a tubular section facing the locking piston. The tubular section in the case of this embodiment is preferably designed in such a way that the locking piston can be inserted, or is inserted, into the tubular section. In this way, the locking piston, for example by its displacement from the initial position into the locked position, could be inserted into the tubular section of the piston. It can also be advantageous, however, if the locking piston is already inserted into the tubular section of the piston in the initial position of said locking piston in order to achieve a simple interaction of locking piston and locking element and to achieve a compact construction.

In an especially advantageous embodiment of the piston-cylinder arrangement according to the invention, provision is made in the tubular section of the piston for a cutout in which the locking element is movably arranged between the released position and the locked position. The cutout is preferably a cutout which is continuous in the radial direction in the tubular section, which tubular section can also be referred to as the skirt of the piston. In the case of a plurality of locking elements, a cutout is preferably associated with each of the locking elements. In order to effect a uniform locking in this case, the locking elements are preferably arranged, or spaced apart, uniformly in the circumferential direction, wherein this should then correspondingly apply to the cutouts which are associated with the locking elements.

In principle, an extremely wide variety of bodies or sprags come into consideration for the locking element and ensure the positively locking connection between locking piston and piston in the released position and the positively locking connection or locking between cylinder and piston in the locked position. In order to ensure in this case a simple movement of the respective locking element from the released position into the locked position, and vice versa, the locking element, in a further preferred embodiment of the piston-cylinder arrangement according to the invention, is formed by a sliding body or a rolling body. The rolling body can be designed in a roller-like form, for example, but it is especially preferred if the rolling body is formed by a spherical rolling body.

In order to effect a reliable and fast return of the locking element from its locked position into its released position when the locking piston returns to the initial position, the locking element, in a further preferred embodiment of the piston-cylinder arrangement according to the invention, is pretensioned into the released position. In this case, it is preferred if a spring device is provided for pretensioning the locking element into the released position. Such a spring device could be formed for example by a spring element inside the respective recess in the inner side of the cylinder. In the case of this embodiment, it is especially preferred, however, if provision is made for at least two locking elements which are interconnected in a ring-like manner via spring elements of the spring device. As a result of the ring-like connection via the spring elements of the spring device the locking elements are therefore pretensioned in the radial direction, wherein the spring elements are possibly designed as tension springs and/or helical springs. In order to create a reliable arrangement of the spring elements of the spring device, which interconnect the locking elements in a ring-like manner, provision can be made for example for groove-like recesses between the cutouts—which are adjacent to each other in the circumferential direction—in the tubular section of the piston, in which recesses the spring elements are accommodated.

It is apparent from the preceding description that the locking element can be formed by a rigid, but movable, body which is possibly pretensioned via the spring device into the released position. In order to simplify the construction further, the locking element, in a further especially preferred embodiment of the piston-cylinder arrangement according to the invention, is itself formed by a spring element which as a result of its elastic deformation can be displaced from the released position into the locked position. Therefore, in the case of this embodiment a two-part construction of the locking mechanism, consisting of a rigid locking element and spring device, can basically be dispensed with.

The locking element, designed as a spring element, in a further advantageous embodiment of the piston-cylinder arrangement according to the invention, is formed as a spring tongue. In order to ensure in this case the positively locking connection between the locking piston and the piston on the one hand and between the piston and the cylinder on the other hand, when the locking element, formed as a spring tongue, is located in the released position or in the locked position, the spring tongue preferably has a first curvature, which in the released position of the spring tongue extends into the recess in the locking piston, and a second curvature, which in the locked position of the spring tongue extends into the recess in the cylinder. The first and second curvatures are preferably in series so that the spring tongue is of S-shaped design in the region of the curvatures.

As already previously indicated, provision is preferably made for a plurality of locking elements. Therefore, it is also preferred, in a further advantageous embodiment of the piston-cylinder arrangement according to the invention, if provision is made for at least two spring tongues. Also, the locking elements, formed as spring tongues, are preferably distributed or spaced apart uniformly in the circumferential direction in order to effect a uniform and reliable locking In order to simplify the fastening of the at least two spring tongues on the piston, the at least two spring tongues are preferably interconnected via a common carrier part. In order to also ensure in this case a simple production of the at least two spring tongues, the at least two spring tongues are preferably interconnected in one piece via the carrier part which, furthermore, is preferably of tubular design in order to achieve its simple fastening on the piston. The carrier part is also especially preferably interfitted, or able to be interfitted, with the piston in order to simplify the assembly of the plurality of spring tongues on the piston. In order to enhance this advantage further, the carrier part is interfitted, or able to be interfitted, with the piston in a possibly locking and/or rotation-resistant manner.

In a further preferred embodiment of the piston-cylinder arrangement according to the invention, the locking piston is pretensioned into its initial position relative to the piston by means of a return spring, for example a compression spring. In this way, the locking piston can be returned again to its initial position relatively quickly if the locking of the piston in the second position on the cylinder is to be released. Also, this embodiment is especially suitable when the locking piston cannot be operated, or operated only with increased effort, in such a way that this can be withdrawn from the locked position into the initial position by means of the force of a drive or by means of a manual force. The return spring for pretensioning the locking piston into its initial position acts preferably between the piston and the locking piston, possibly in the axial direction, in the case of this embodiment.

In order to ensure that the locking piston is not moved from the locked position via the initial position, which perhaps could lead to the locking elements no longer being able to return from the locked position into their released position, the locking piston, in a further preferred embodiment of the piston-cylinder arrangement according to the invention, can be supported, or is supported, on the piston in the initial position in that axial direction in which the locking piston can be displaced from the locked position into the initial position. This supporting can be carried out for example by means of a locking ring which acts between the locking piston and the piston. In any case, it is apparent from the preceding description that the initial position of the locking piston is an end position of said locking piston.

In a further advantageous embodiment of the piston-cylinder arrangement according to the invention, the locking piston, in the locked position, can be supported, or is supported, on the piston in one of the two axial directions so that the locked position of the locking piston is correspondingly an end position of said locking piston relative to the piston.

In a further advantageous embodiment of the piston-cylinder arrangement according to the invention, a pressure chamber for accommodating a pressure medium, possibly a hydraulic medium, is provided in the cylinder. In the case of the pressure chamber, reference may also be made to a displacement chamber and/or compression chamber in which the pressure medium is accommodated and can be displaced and/or compressed by means of the piston-cylinder arrangement.

In a further especially preferred embodiment of the piston-cylinder arrangement according to the invention, the piston and the locking piston have in each case an end face, delimiting the pressure chamber, for pressure application of the pressure medium so that the piston and the locking piston form a cascaded piston unit. Correspondingly, the end face of the piston is broken in this embodiment so that the locking piston also has an end face, delimiting the pressure chamber, for pressure application of the pressure medium. With such a cascaded piston unit, a two-stage displacement or compression of the pressure medium is possible, which is especially practical in the case of clutches in which the so-called air gap has to be overcome first of all before the pressure force in a second stage is increased.

Alternatively to the cascaded piston unit, in a further advantageous embodiment of the piston-cylinder arrangement according to the invention, only the piston of the piston and locking piston has an end face, delimiting the pressure chamber, for pressure application of the pressure medium.

The operating device according to the invention serves for operating a clutch, wherein the operating device is preferably a hydraulic operating device and the operating device serves especially preferably for operating a multidisk clutch, possibly a wet-running multidisk clutch. The operating device in any case has a piston-cylinder arrangement according to the previously described type according to the invention. In principle, the piston-cylinder arrangement can be arranged inside the operating device either on the input side or on the output side, but in an advantageous embodiment of the operating device according to the invention the piston-cylinder arrangement is designed as an input-side piston-cylinder arrangement.

In an especially preferred embodiment of the operating device according to the invention, the clutch can be transferred, or is transferred, by displacement of the piston into the second position, into a closed position in which the clutch is closed, or into an open position in which the clutch is open, so that correspondingly it is either an operating device for a normally open clutch or an operating device for a normally closed clutch.

The invention is explained in more detail in the following text based on exemplary embodiments with reference to the attached drawings. In the drawings.

Figure 1:
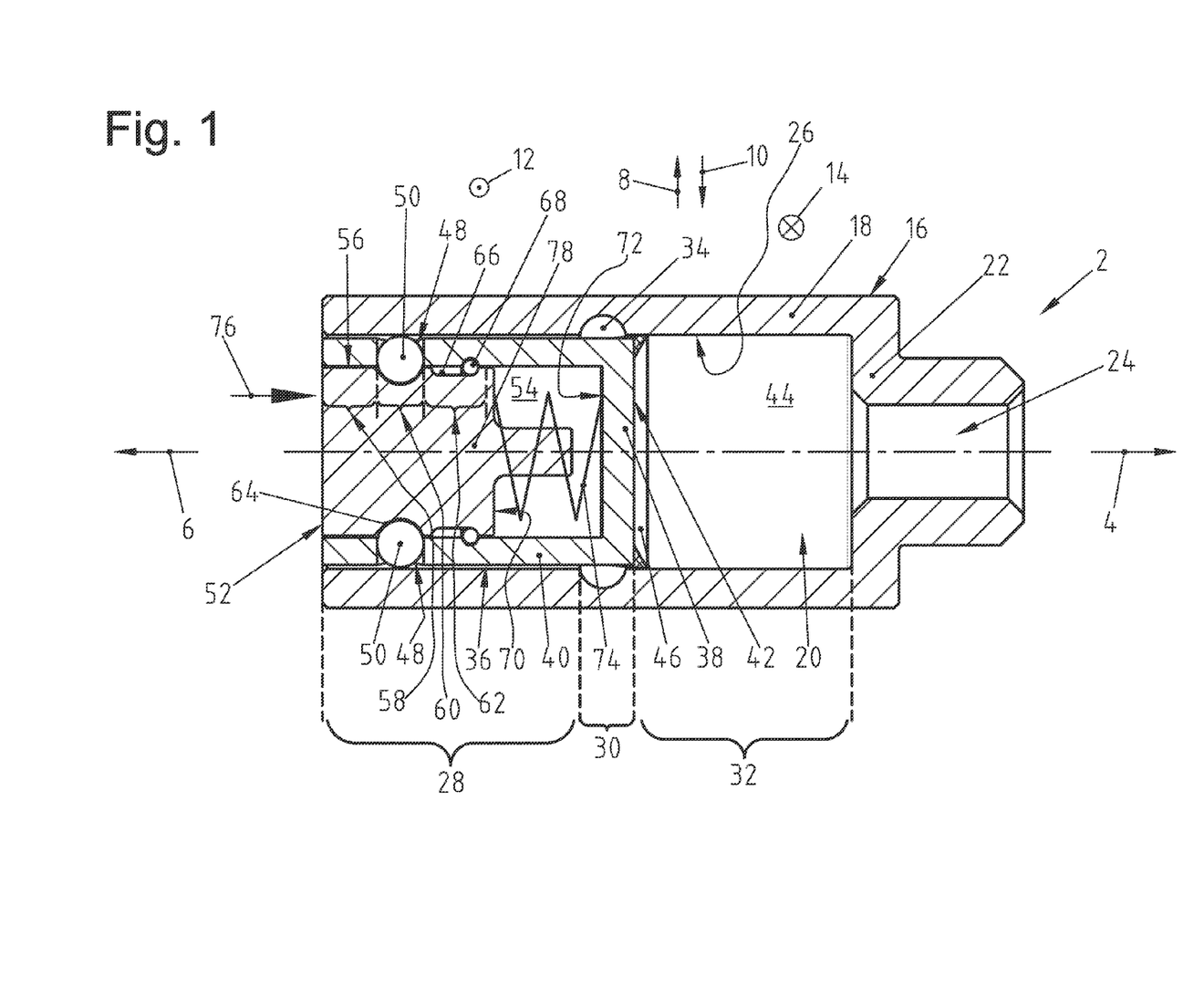
FIG. 1 shows a side view of a first embodiment of the piston-cylinder arrangement according to the invention in sectioned view with the piston in the first position, the locking element in the released position and the locking piston in the initial position.
Figure 2:
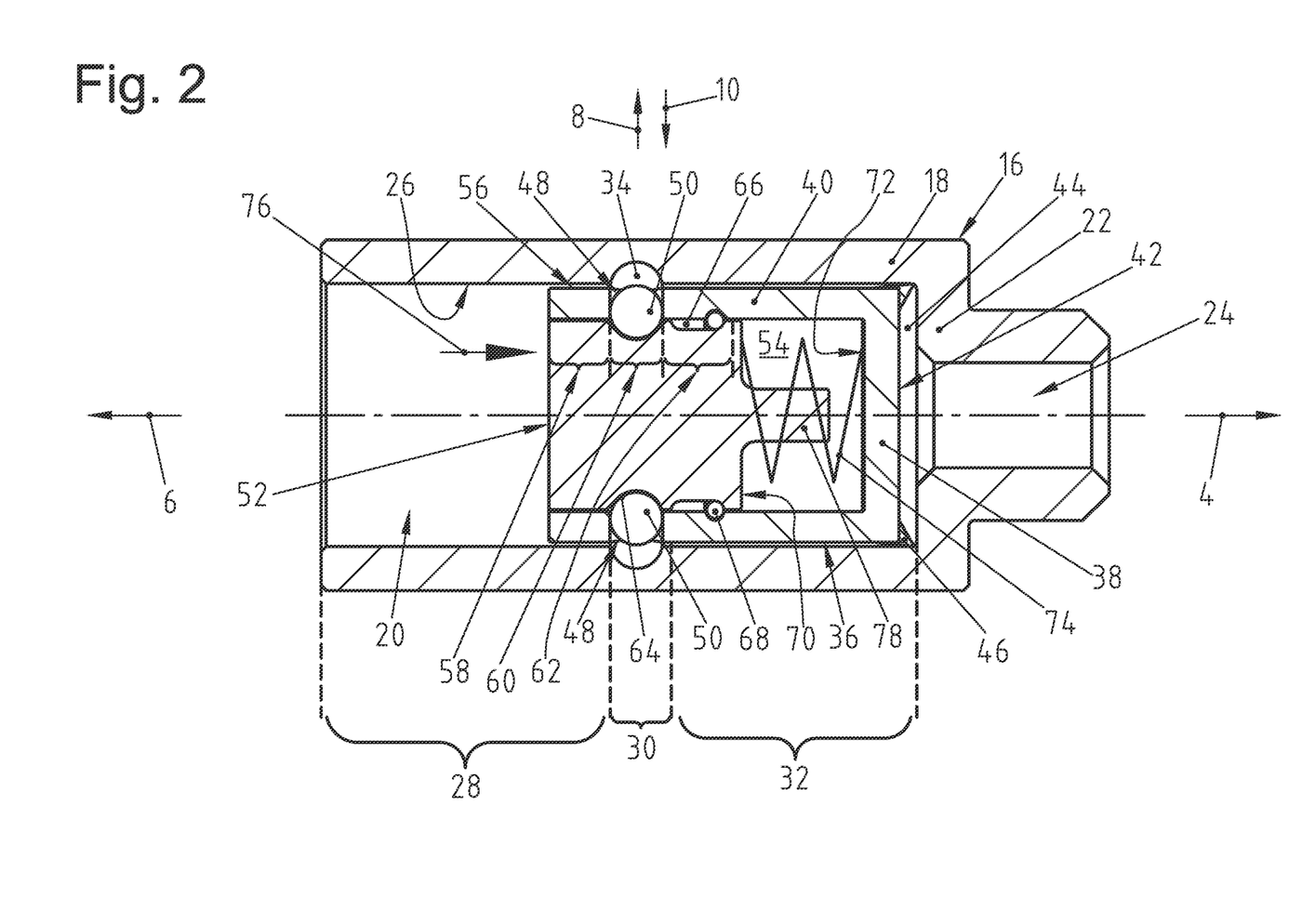
FIG. 2 shows the piston-cylinder arrangement of FIG. 1 with the piston in the second position.
Figure 3:
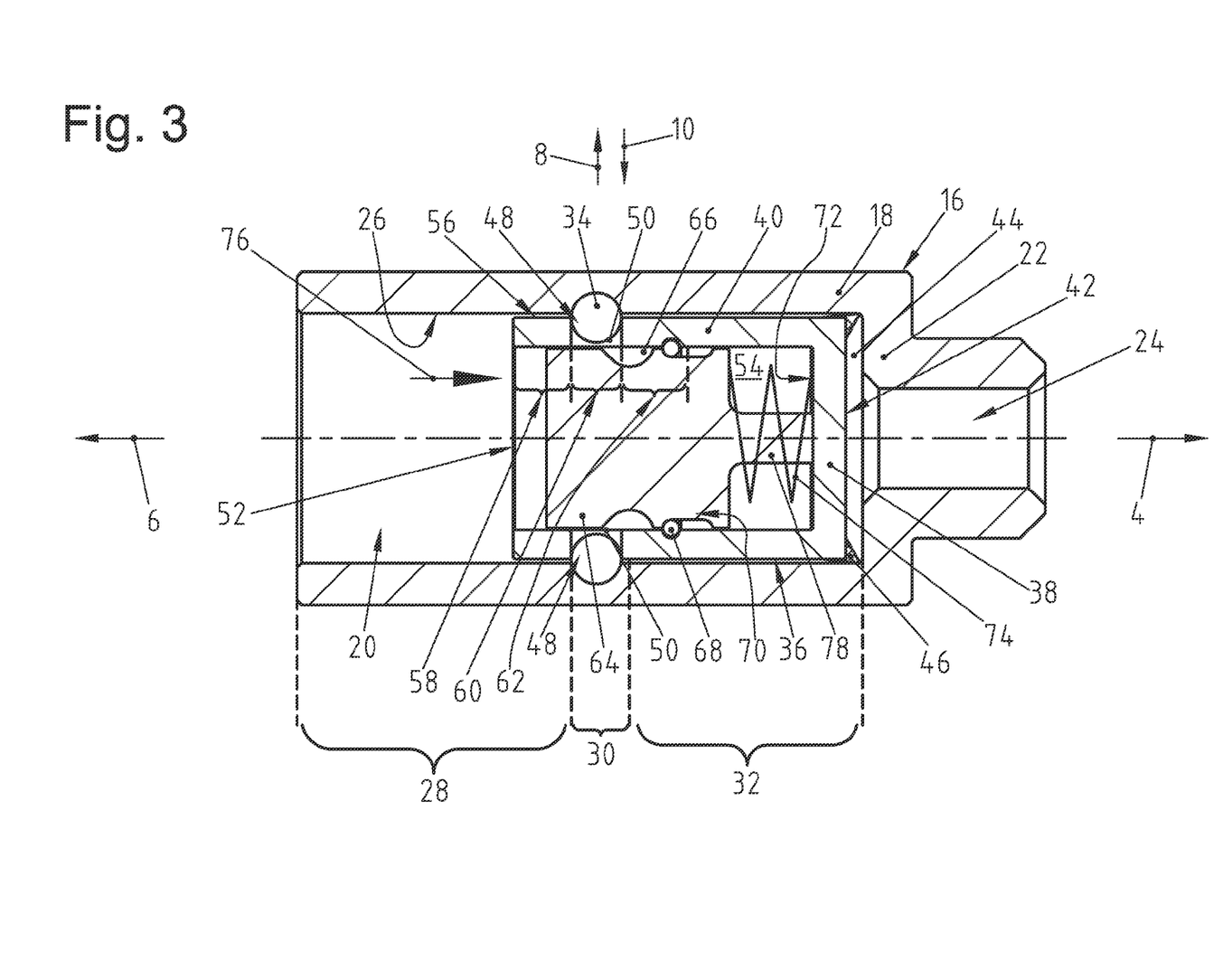
FIG. 3 shows the piston-cylinder arrangement of FIG. 2 with the locking element in the locked position and the locking piston in the locked position.

FIGS. 1 to 3 show a first embodiment of the piston-cylinder arrangement 2 according to the invention for the operating device of a clutch, which is not shown in more detail. In the figures, the mutually opposite axial directions 4, 6, the mutually opposite radial directions 8,10 and the mutually opposite circumferential directions 12, 14 of the piston-cylinder arrangement 2 are indicated by means of corresponding arrows.

The piston-cylinder arrangement 2 has a cylinder 16. The cylinder 16 has a wall 18, extending in the circumferential direction 12, 14, which outwardly encloses a basically cylindrical cylinder inner chamber 20 in the radial direction 8. The cylinder inner chamber 20 is also delimited in the axial direction 4 by means of an end wall 22, wherein an opening 24 is formed in the end wall 22, via which a pressure medium, preferably a hydraulic medium, is introduced into the cylinder inner chamber 20 or can be displaced out of the cylinder inner chamber 20.

The wall 18, which is formed as a tubular wall in this case, has an inner side 26 pointing inward in the radial direction 10 and facing the cylinder inner chamber 20. The tubular wall 18, extending in the axial directions 4, 6, has a first axial section 28, a second axial section 30, following the first axial section 28 in the axial direction 4, and a third axial section 32, following the second axial section 30 in the axial direction 4. Whereas the inner side 26 in the first and third axial sections 28, 32 extends essentially in the axial direction 4, 6, a recess 34 is provided in the inner side 26 of the wall 18 of the cylinder 16 in the region of the second axial section 30, wherein the recess 34 is a groove-like and encompassing recess in the circumferential direction 12, 14. The recess 34 has a circle segment-shaped cross section, alternatively the cross section could also be of trapezoidal or triangular design in order to be formed like a ramp.

Arranged inside the cylinder inner chamber 20 is a piston 36 which can be displaced in the axial direction 4, 6. The piston 36 has an end wall 38, extending essentially in the radial direction 8, 10, and a tubular section 40 which adjoins the end wall 38 in the axial direction 6 and faces the locking piston which is described in more detail later. Therefore, the piston 36, according to the embodiment according to FIGS. 1 to 3, can also be referred to as a bucket-form piston 36. The end wall 38 has an end face 42 pointing in the axial direction 4 which delimits a pressure chamber 44 inside the cylinder inner chamber 20 in the axial direction 6. In the depicted embodiment, only the piston 36 has an end face 42 which delimits the pressure chamber 44 in the axial direction 6, but not the locking piston, which is described in more detail later, wherein the end face 42 serves for the pressure application of the pressure medium inside the pressure chamber 44 and therefore can also be referred to as the effective piston area of the piston 36. Also arranged on the piston 36 in the region of the end wall 38 or the end face 42 is an encompassing seal 46 in the circumferential direction 12, 14, which in the third axial section 32 of the cylinder 16 effects sealing of the pressure chamber 44 in the axial direction 6 in relation to the remaining cylinder inner chamber 20.

In the tubular section 40 of the piston 36 provision is made for a plurality of cutouts 48 which are arranged and spaced apart uniformly in the circumferential direction 12, 14, and in each case extend continuously through the tubular section 40 of the piston 36 in the radial direction 8, 10. A locking element 50, which can be formed as a sliding body or rolling body, is arranged in the cutouts 48 in each case. In the present example, the locking element 50 is formed as a spherical rolling body. The locking element 50 is introduced into the cutouts 48 in such a way that this is movable inside the cutout 48 in the radial direction 8, 10. Thanks to the arrangement of the locking elements 50 in the cutouts 48, it is ensured that the locking element 50 is connected to the piston 36 with regard to the axial direction 4, 6, that is to say a movement of the piston 36 in the axial direction 4, 6 also leads to a movement of the locking elements 50 in the axial directions 4 or 6, and vice versa.

The piston 36 can be displaced inside the cylinder 16 by means of a locking piston 52. The locking piston 52 can be inserted, or is inserted, in the axial direction 4 into the free space 54 which is enclosed by the tubular section 40 so that this can also be referred to as a radial nesting of piston 36 and locking piston 52. The locking piston 52 has an outer side 56 pointing outward in the radial direction 8, wherein the locking piston 52 is also divided into a first axial section 58, a second axial section 60 which follows the first axial section 58 in the axial direction 4, and a third axial section 62 which follows the second axial section 60 in the axial direction 4. Whereas the outer side 56 extends essentially in a straight line in the axial direction 4, 6 in the region of the first axial section 58, provision is made in the second axial section 60 for a recess 64 which is designed in the form of a groove and extends in an encompassing manner in the circumferential direction 12, 14. As previously in the case of the recess 34 in the cylinder 16, the recess 64 in the outer side 56 of the locking piston 52 is also provided with a ramp-like cross section, wherein the ramp-like cross section here is designed as a circle segment-shaped cross section. Alternatively, it is again possible here to design the cross section of the recess 64 with a trapezoidal or triangular shape. In the third axial section 62, provision is made for a further encompassing recess 66 in the outer side 56 of the locking piston 52, into which extends a stop 68—in this case a locking ring—which, in an encompassing manner in the circumferential direction 12, 14, is fixed on the side of the tubular section 40 of the piston 36 which points inward in the radial direction 10. Furthermore, a return spring is arranged between the end face 70 of the locking piston 52, which points in the axial direction 4, and the rear face 72 of the end wall 38 of the piston 36, which points in the axial direction 6, which return spring is provided with the designation 74 and can be designed for example as a compression spring or helical spring which acts in the axial direction 4, 6.

Further features of the piston-cylinder arrangement 2 and also its principle of operation shall be described below with reference to FIGS. 1 to 3.

FIG. 1 shows the piston 36 in a first position with regard to the axial directions 4, 6 relative to the cylinder 16. The locking piston 52 on the other hand is arranged in an initial position relative to the piston 36. In the initial position of the locking piston 52, the locking elements 50 are inwardly offset inside the cutouts 48 in the radial direction 10 so that on one side these are arranged in the cutouts 48 and on the other side extend inwardly in the radial direction 10 into the recess 64 in the outer side 56 of the locking piston 52. Therefore, the locking elements 50 are located in a released position in which the piston 36 is not locked relative to the cylinder 16 and therefore can be displaced in the axial direction 4, 6. The piston 36 can be displaced in the axial direction 4 by means of the locking piston 52 by an operating force 76 being applied to the locking piston 52 in the axial direction 4, since the locking piston 52, in the released position of the locking element 50 shown in FIG. 1, is connected via the locking element 50 in a positively locking manner to the piston 36 in the axial direction 4, 6. The initial position of the locking piston 52 relative to the piston 36, shown in FIG. 1, is an end position of the locking piston 52 with regard to the axial direction 6, since this is supported on the piston 36 via the stop 68 in the axial direction 6, possibly or even exclusively via the locking element 50. The return spring 74 is designed in such a way that this pretensions the locking piston 52 into the initial position relative to the piston 36 shown in FIG. 1. Furthermore, the locking element 50 is outwardly supported in the radial direction 8 on the inner side 26 of the cylinder 16 and therefore retained in the released position as long as the locking element 50 is located in the first axial section 28 of the encompassing wall 18 of the cylinder 16.

By application of the operating force 76 to the locking piston 52—on account of the previously described positively locking connection between the locking piston 52 and piston 36 via the locking element 50—the piston 36 is displaced in the axial direction 4 into the second position of the piston 36 shown in FIG. 2. The second position of the piston 36 according to FIG. 2 is an end position, since the piston 36 in the second position is supported on the cylinder 16, in this case on the end wall 22 of the cylinder 16, in the axial direction 4.

In the second position of the piston 36, the locking elements 50 are arranged in the region of the second axial section 30 of the wall 18 of the cylinder 16 and therefore in the region of the cylinder-side recess 34. Therefore, the locking elements 50 are no longer retained by the inner side 26 of the wall 18 in their released position shown in FIG. 1, rather the locking elements 50 can move outward in the radial direction 8 inside the cutouts 48 and into the cylinder-side recess 34. If in the second position of the piston 36, shown in FIG. 2, the operating force 76 is still exerted upon the locking piston 52, then this results in the locking piston 52 being displaced from the initial position relative to the piston 36, shown in FIG. 2, and against the restoring force of the return spring 74, into the locked position according to FIG. 3. This is carried out by displacement of the locking element 50 outward in the radial direction 8 from the released position, shown in FIG. 2, into the locked position, shown in FIG. 3, in which the piston 36 is locked via the locking element 50 in a positively locking manner relative to the cylinder 16. In other words, the locking element 50, during displacement of the locking piston 52 from the initial position according to FIG. 2 into the locked position according to FIG. 3, is displaced from the recess 64 on the outer side 56 of the locking piston 52 so as to extend outward in the radial direction 8 into the recess 34 in the inner side 26 of the wall 18 of the cylinder 16.

In the locked position of the locking piston 52 according to FIG. 3, the locking elements 50 can be supported, or are supported, on the outer side 56 in the region of the first axial section 58 perpendicularly to the axial directions 4, 6, that is to say in the radial direction 10, without creating a supporting force which acts upon the locking piston 52 in the axial direction 6 so that the locking elements 50 are reliably retained in their locked position when the locking piston 52 is transferred into the locked position according to FIG. 3. The locked position of the locking piston 52 constitutes an end position of the locking piston 52 with regard to the axial direction 4, since the locking piston 52 is supported, via a projecting step 78 on the end face 70 of the locking piston 52, on the rear face 72 of the end wall 38 of the piston 36 and/or is supported on the piston 36 via the stop 68 in the axial direction 4. To retain the locking piston 52 in the locked position requires only a reduced operating force 76, which is suitable for overcoming the restoring force of the return spring 74.

In order to displace the piston 36 again into its first position according to FIG. 1, only the operating force 76, which is already reduced anyway, needs to be further reduced so that the restoring force of the return spring 74 effects a displacement of the locking piston 52 relative to the piston 36 in the axial direction 6 from the locked position according to FIG. 3 into the initial position according to FIG. 2. In the initial position, the locking elements 50 can return again in the radial direction 10 inwardly into the released position so that locking of the piston 36 relative to the cylinder 16 is overridden. Following this, the piston 36 can be displaced in the axial direction 6 into the second position according to FIG. 1 by means of the pressure inside the pressure chamber 44 or by means of active force exertion upon the locking piston 52.

Although not shown in FIGS. 1 to 3 for reasons of clarity, the locking elements 50 are preferably pretensioned into the released position according to FIGS. 1 and 2. In other words, the locking elements 50 are pretensioned inwardly in the radial direction 10. For this purpose, a spring device is preferably provided for pretensioning the locking element 50 into the released position. In this case, it is preferred if the at least two locking elements 50 are interconnected in a ring-like manner via spring elements of the spring device, wherein the spring elements can be tension springs and/or helical springs, for example. In order to ensure in this case the ring-like connection via the spring elements of the spring device, grooves, for example, can extend in the tubular section 40 of the piston 36 between the cutouts 48, by means of which the spring elements, that is to say the tension springs and/or helical springs, as applicable, of the spring device extend in order to interconnect the locking elements 50 which are arranged in the cutouts 48.

Figure 4:
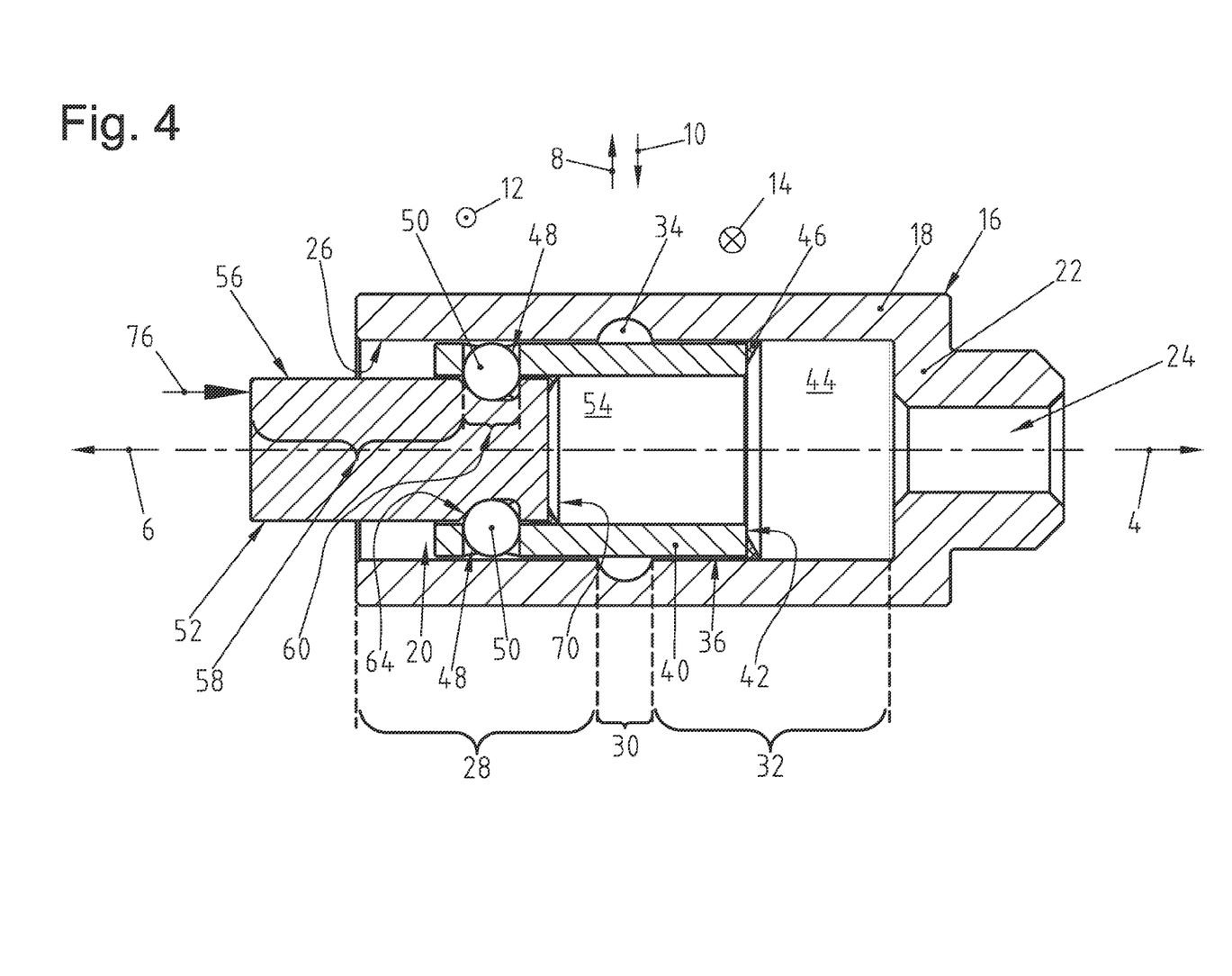
FIG. 4 shows a second embodiment of the piston-cylinder arrangement according to the invention in sectioned view with the piston in the first position, the locking element in the released position and the locking piston in the initial position.
Figure 5:
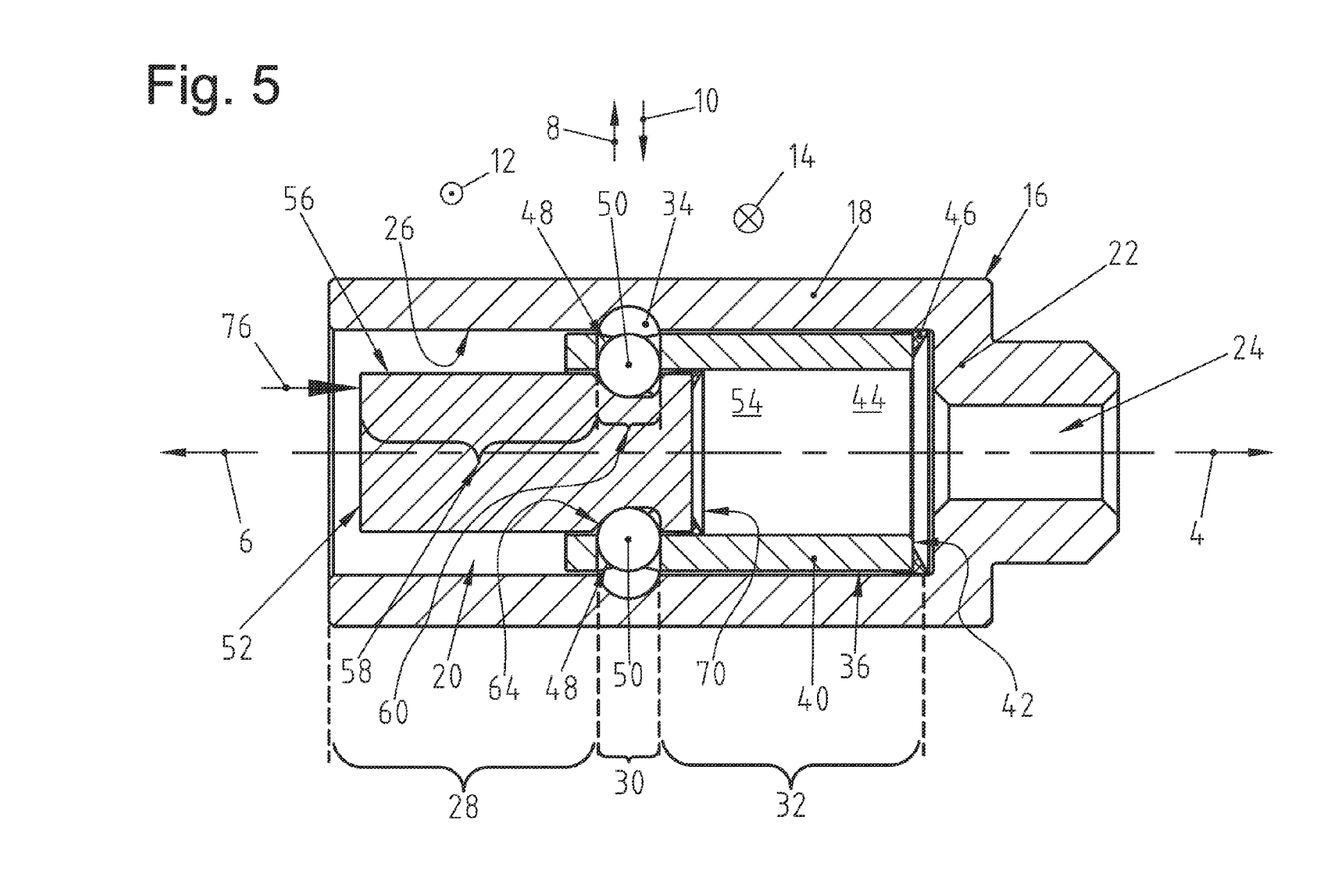
FIG. 5 shows the piston-cylinder arrangement of FIG. 4 with the piston in the second position.
Figure 6:
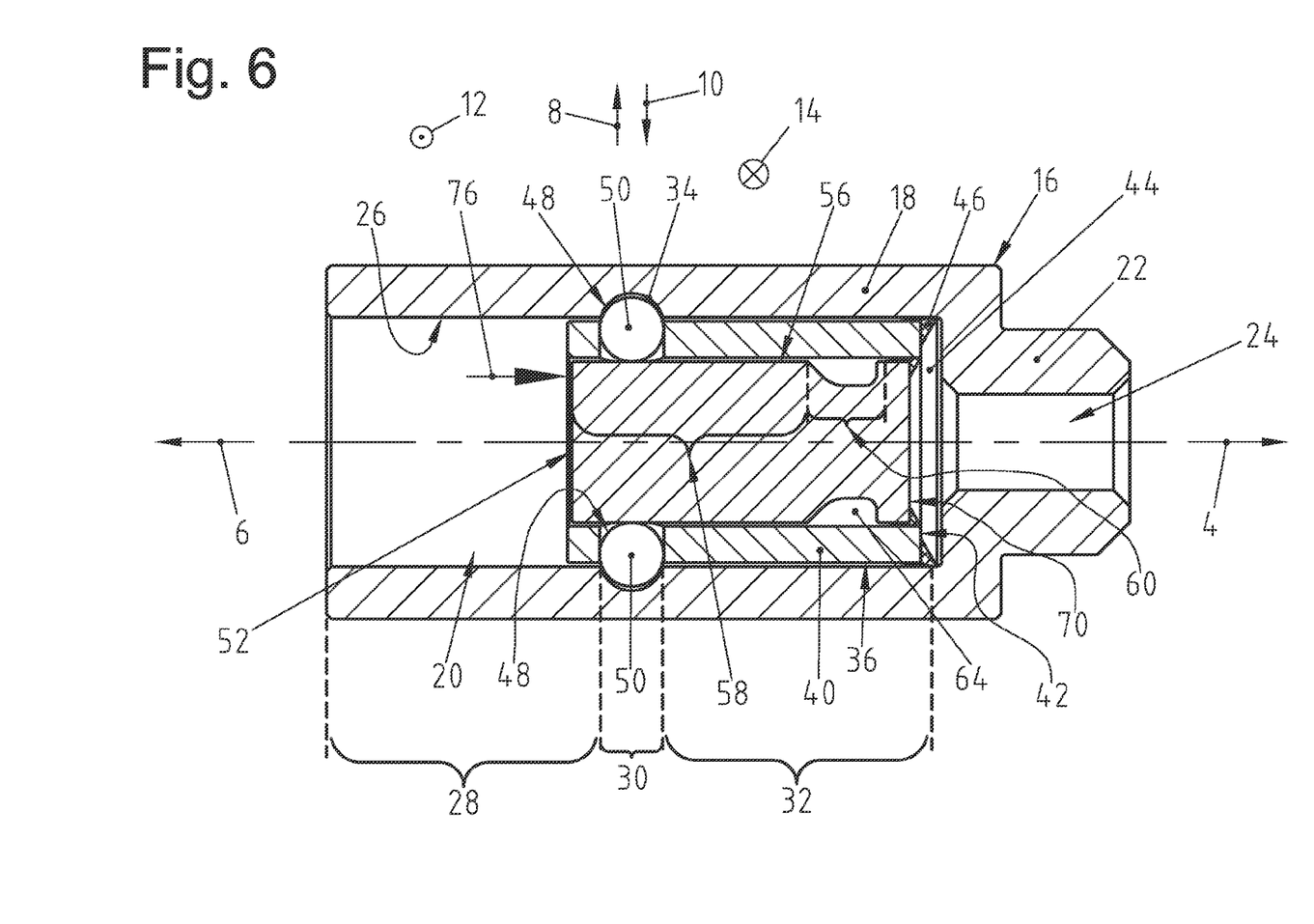
FIG. 6 shows the piston-cylinder arrangement of FIG. 5 with the locking element in the locked position and the locking piston in the locked position.
Figure 7:
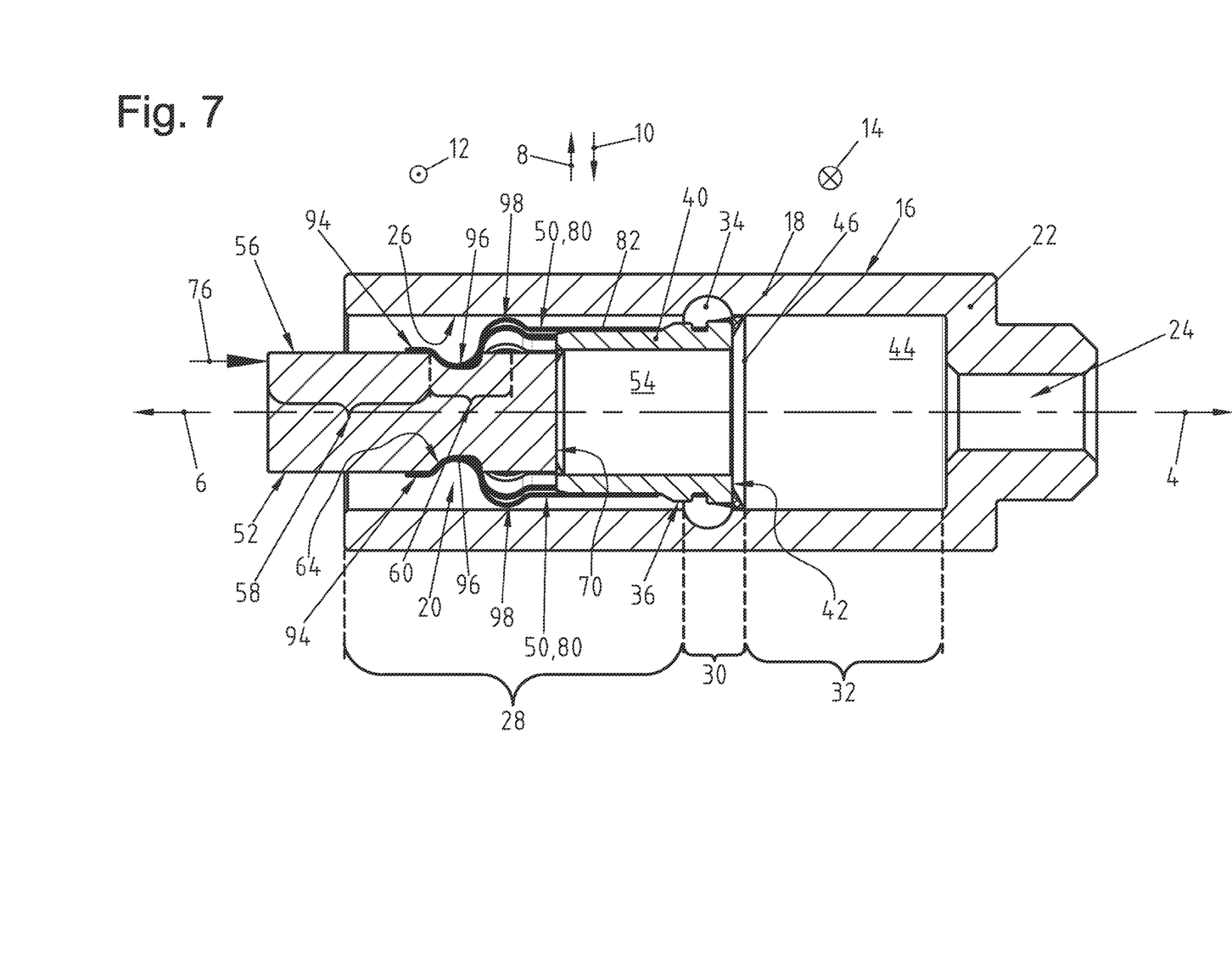
FIG. 7 shows a side view of a third embodiment of the piston-cylinder arrangement according to the invention in sectioned view with the piston in the first position, the locking element in the released position and the locking piston in the initial position.
Figure 8:
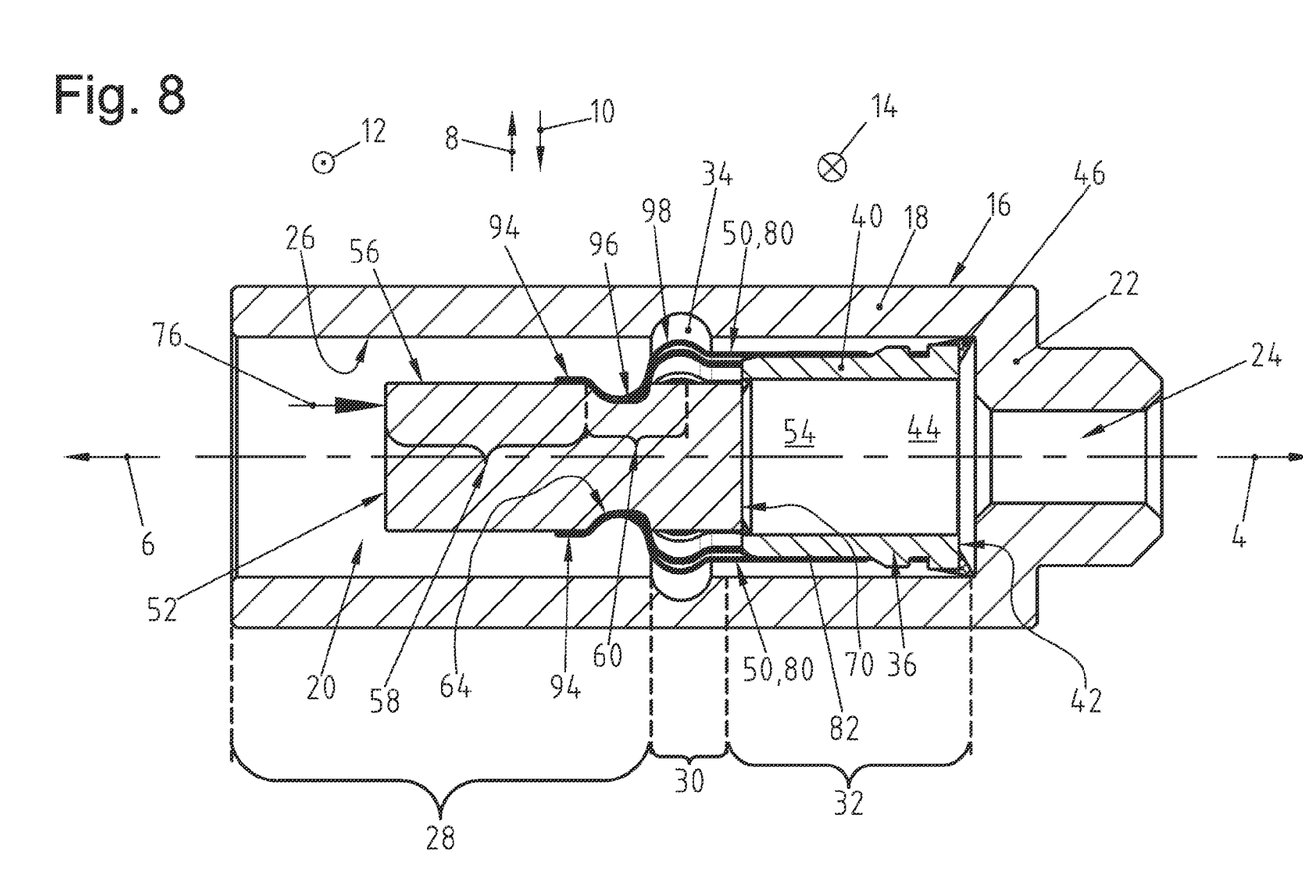
FIG. 8 shows the piston-cylinder arrangement of FIG. 7 with the piston in the second position.
Figure 9:
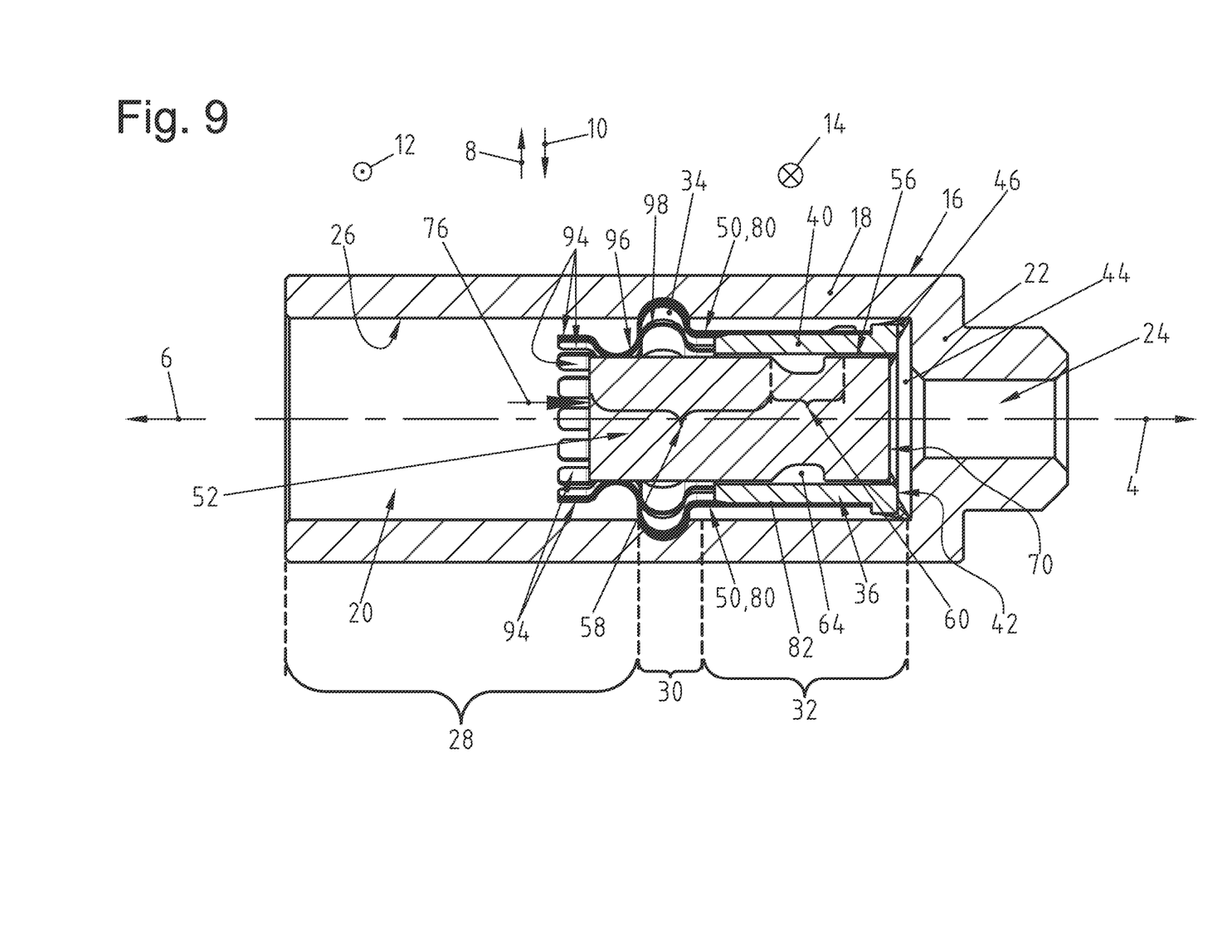
FIG. 9 shows the piston-cylinder arrangement of FIG. 8 with the locking element in the locked position and the locking piston in the locked position.
Figure 10:
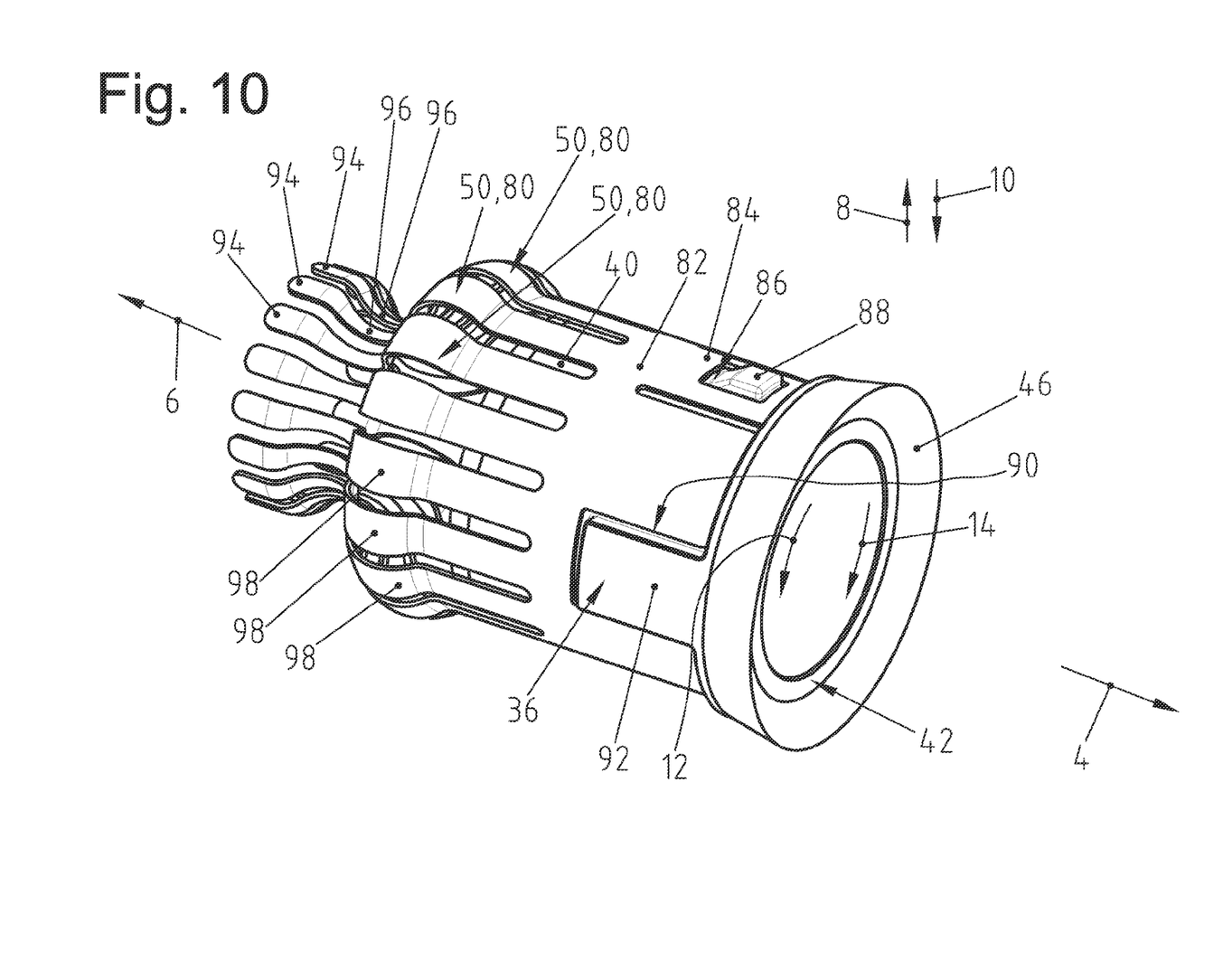
FIG. 10 shows a perspective view of the piston-cylinder arrangement from FIGS. 7 to 9 with the piston and the locking element in isolation.
Figure 11:
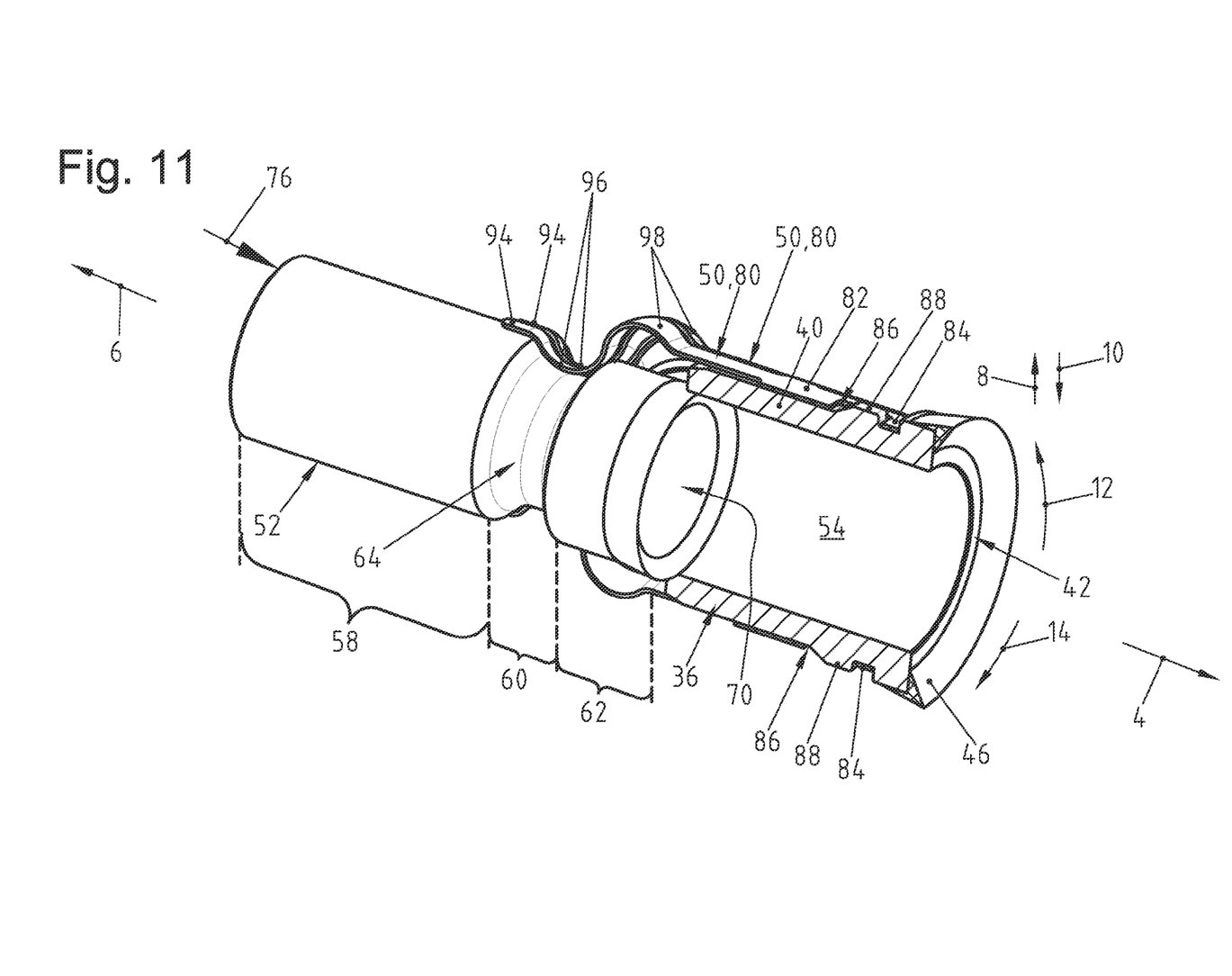
FIG. 11 shows a perspective view of the piston-cylinder arrangement from FIGS. 7 to 10 with the piston, the locking element and the locking piston in isolation and in partially sectioned view.

Described below with reference to FIGS. 4 to 6 is a second embodiment of the piston-cylinder arrangement 2 which corresponds in the main to the first embodiment according to FIGS. 1 to 3 so that below only the differences shall be explained, the same or similar parts are provided with the same designations, and the preceding description of the first embodiment is correspondingly applicable in other respects.

In contrast to the first embodiment, in the second embodiment, in the case of the piston 36, the end wall 38 is largely dispensed with so that the piston 36 is formed in the main from the tubular section 40. Therefore, the end face 42, which delimits the pressure chamber 44, is designed for pressure application of the pressure medium inside the pressure chamber 44 no longer in a circular manner but rather in a ring-like manner. This also results in the end face 70 of the locking piston 52 also delimiting the pressure chamber 44 in the axial direction 6 and therefore also serving for pressure application of the pressure medium inside the pressure chamber 44. In other words, a cascaded piston unit, which is formed by the piston 36 and the locking piston 52, is proposed here. Therefore, the pressure medium inside the pressure chamber 44 can be pressurized in two stages, specifically by displacement of the piston 36 from the first position according to FIG. 4 into the second position according to FIG. 5 on the one hand, and on the other hand by displacement of the locking piston 52 relative to the piston 36 from the initial position according to FIG. 5 into the locked position according to FIG. 6.

It is also apparent from FIGS. 5 and 6 that a return spring 74 can basically be dispensed with, since an increase of the pressure in the pressure chamber 44 would effect a return of the locking piston 52 from the locked position according to FIG. 6 into the initial position according to FIG. 5, however it can also be advantageous in the case of the second embodiment if provision is made for such a return spring 74. Furthermore, in the case of the second embodiment according to FIGS. 4 to 6, the projecting step 78, the stop 68 and the encompassing recess 66 can also be dispensed with, since the locking piston 52 in its locked position according to FIG. 6 can be supported, or is supported, on the end wall 22 of the cylinder 16 in the axial direction 4 in order to make the locked position an end position of the locking piston 52. Nevertheless, in the case of the second embodiment a stop in the sense of the stop 68 can also be provided in order to effect at least one support of the locking piston 52 on the piston 36 in the axial direction 6 when the locking piston 52 is located in its initial position according to FIGS. 4 and 5.

Described below, with reference to FIGS. 7 to 11, is a third embodiment of the piston-cylinder arrangement 2 which in the main is similar to the previously described second embodiment according to FIGS. 4 to 6 so that below only the differences shall be explained, the same designations are used for the same or similar parts and the preceding description is correspondingly applicable in other respects.

As already indicated with reference to the previously described embodiments of the piston-cylinder arrangement 2, the locking mechanism can be formed by a rigid locking element 50 in conjunction with a spring device for pretensioning the locking elements 50 into the released position. In the third embodiment according to FIGS. 7 to 11, the locking elements 50 are formed in each case by a spring element which by their elastic deformation can be displaced from the released position into the locked position. In this case, the locking elements 50, formed as spring elements, are preferably formed as spring tongues 80. The spring tongues 80 are interconnected in one piece via a common, tubular carrier part 82, wherein the tubular carrier part 82 is interfitted with the piston 36 in the axial direction 4, 6. More precisely, the carrier part 82 is fitted onto the tubular section 40 of the piston 36 in the axial direction 4, wherein the carrier part 82 has at least one locking tongue 84, projecting in the axial direction 4, with a window 86 into which extends a step 88, which projects outwardly in the radial direction 8, on the outer side of the tubular section 40. Thanks to the locking tongue 84 and the projecting step 88, the carrier part 82 is therefore interfitted with the piston 36 with locking effect so that the carrier part 82 together with the spring tongues 80 is connected to the piston 36 with regard to the axial direction 4, 6. Furthermore, the projecting step 88, interacting with the window 86 in the locking tongue 84, effects a rotation-resistant arrangement of the carrier part 82 relative to the piston 36 with regard to the circumferential direction 12, 14. In order to assist the rotation-resistant arrangement, provision can be made, furthermore, for additional axial incisions 90 in the carrier part 82 into which additional projecting steps 92 on the tubular section 40 of the piston 36 extend outward in the radial direction 8.

The spring tongues 80 extend from the tubular carrier part 82 basically in the axial direction 6 up to its free end 94. Extending from the free end 94, the spring tongues 80 have a first curvature 96—which extends inward in the radial direction 10 and in the released position of the spring tongue 80 according to FIGS. 7 and 8 extends into the recess 64 in the locking piston 52—and a second curvature 98 which follows the first curvature 96 in the axial direction 4 and extends outward in the radial direction 8 and in the locked position of the spring tongue 80 according to FIG. 9 extends into the recess 34 in the cylinder 16.

The operating device, which is not shown in more detail, especially a hydraulic operating device, for operating a clutch, especially a multidisk clutch, has at least one piston-cylinder arrangement 2 of the previously described type. In this case, the piston-cylinder arrangement 2 is formed in the operating device preferably as an input-side piston-cylinder arrangement 2. Furthermore, the clutch, which is not shown in more detail, can especially preferably be transferred by displacement of the piston 36 into the second position, possibly together with displacement of the locking piston 52 into the locked position, into a closed position in which the clutch is closed, or into an open position in which the clutch is open.

LIST OF DESIGNATIONS

2 Piston-cylinder arrangement
4 Axial direction
6 Axial direction
8 Radial direction
10 Radial direction
12 Circumferential direction
14 Circumferential direction
16 Cylinder
18 Wall
20 Cylinder inner chamber
22 End wall
24 Opening
26 Inner side
28 First axial section
30 Second axial section
32 Third axial section
34 Recess
36 Piston
38 End wall
40 Tubular section
42 End face
44 Pressure chamber
46 Seal
48 Cutouts
50 Locking element
52 Locking piston
54 Free space
56 Outer side
58 First axial section
60 Second axial section
62 Third axial section
64 Recess
66 Encompassing recess
68 Stop
70 End face
72 Rear face
74 Return spring
76 Operating force
78 Projecting step
80 Spring tongue
82 Carrier part
84 Locking tongue
86 Window
88 Projecting step
90 Axial incisions
92 Projecting steps
94 Free end
96 First curvature
98 Second curvature

The invention claimed is:

1. A piston-cylinder arrangement for the operating device of a clutch, having a cylinder, a piston which is arranged in the cylinder and can be displaced in the axial direction, and at least one locking element which is associated with the piston, wherein the piston can be displaced from a first position into a second position, in which the locking element can be moved from a released position into a locked position in which the piston is locked in the second position via the locking element in a positively locking manner, wherein the piston can be displaced by means of a locking piston which in the released position of the locking element is connected via the locking element to the piston in a positively locking manner in the axial direction and in the second position of the piston, with displacement of the locking element from the released position into the locked position relative to the piston, can be displaced in the axial direction from an initial position into a locked position.

2. The piston-cylinder arrangement as claimed in claim 1, wherein the locking element in the locked position of the locking piston, with retention of the locking element in the locked position, is supported on the locking piston.

3. The piston-cylinder arrangement as claimed in claim 1, wherein provision is made in the outer side of the locking piston for a recess into which extends the locking element in the released position and out of which the locking element can be displaced by displacement of the locking piston.

4. The piston-cylinder arrangement as claimed in claim 1, wherein the locking element is connected to the piston with regard to the axial direction wherein provision is made in the inner side of the cylinder for a recess into which the locking element can be displaced in the second position of the piston, achieving the locked position.

5. The piston-cylinder arrangement as claimed in claim 1, wherein the piston has a tubular section facing the locking piston, into which the locking piston is inserted, wherein provision is made in the tubular section for a cutout in which the locking element is movably arranged between the released position and the locked position, and the locking element is formed by a sliding body or a rolling body, possibly a spherical rolling body.

6. The piston-cylinder arrangement as claimed in claim 1, wherein the locking element is pretensioned into the released position, wherein provision is made for a spring device for pretensioning the locking element into the released position and provision is made for at least two locking elements which are interconnected in a ring-like manner via spring elements.

7. The piston-cylinder arrangement as claimed in claim 1, wherein the locking element is formed by a spring element which by its elastic deformation can be displaced from the released position into the locking position, wherein the spring element is preferably designed as a spring tongue which especially preferably has a first curvature which in the released position of the spring tongue extends into the recess in the locking piston, and a second curvature which in the locked position of the spring tongue extends into the recess in the cylinder.

8. The piston-cylinder arrangement as claimed in claim 7, wherein provision is made for at least two spring tongues which are interconnected via a common carrier part.

9. The piston-cylinder arrangement as claimed in claim 1, wherein the locking piston is pretensioned into the initial position by means of a return spring which acts between the piston and the locking piston or the locking piston.

10. The piston-cylinder arrangement as claimed in claim 1, wherein provision is made in the cylinder for a pressure chamber for accommodating a pressure medium.

\* \* \* \* \*